United States Patent [19]

Allais et al.

[11] 3,910,922
[45] *Oct. 7, 1975

[54] NOVEL TRIFLUOROMETHYL-QUINOLINES

[75] Inventors: André Allais, Les Lilas; Jean Meier, Coeuilly-Champigny, both of France

[73] Assignee: Roussel-UCLAF, Paris, France

[ * ] Notice: The portion of the term of this patent subsequent to June 10, 1986, has been disclaimed.

[22] Filed: June 3, 1969

[21] Appl. No.: 830,148

[30] Foreign Application Priority Data
Nov. 8, 1968    France.......................... 173.099

[52] U.S. Cl......... 260/287 R; 260/247.2 B; 424/258
[51] Int. Cl.².................................... C07D 215/14
[58] Field of Search.......................... 260/287, 247.2

[56] References Cited
UNITED STATES PATENTS

| | | | |
|---|---|---|---|
| 3,151,026 | 9/1964 | Allais et al............................ | 260/287 |
| 3,174,972 | 3/1965 | Allais et al............................ | 260/287 |
| 3,449,347 | 6/1969 | Allais et al............................ | 260/287 |
| 3,463,780 | 8/1969 | Allais et al............................ | 260/287 |

Primary Examiner—Donald G. Daus
Assistant Examiner—James H. Turnipseed
Attorney, Agent, or Firm—Hammond & Littell

[57] ABSTRACT 7- or 8-trifluoromethyl-quinolines of the formula

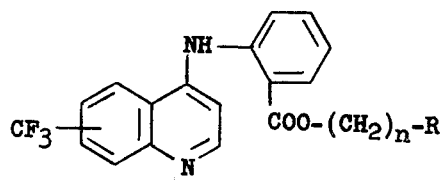

I wherein $n$ is 1 or 2 and R is selected from the group consisting of saturated and unsaturated heterocyclic having an oxygen atom, a nitrogen atom or both a nitrogen and oxygen atom and their non-toxic, pharmaceutically acceptable acid addition salts having analgesic and anti-inflammatory activity and their preparation.

4 Claims, No Drawings

NOVEL TRIFLUOROMETHYL-QUINOLINES

OBJECTS OF THE INVENTION

It is an object of the invention to provide the novel quinolines of formula I and their acid addition salts.

It is another object of the invention to provide a novel process for the preparation of the quinolines of formula I.

It is a further object of the invention to provide novel analgesic and anti-inflammatory compositions.

It is an additional object of the invention to provide a novel method of treating pain and inflammation in warm-blooded animals.

These and other objects and advantages of the invention will become obvious from the following detailed description.

THE INVENTION

The novel compounds of the invention are selected from the group consisting of 7- and 8-trifluoromethyl-quinolines of the formula

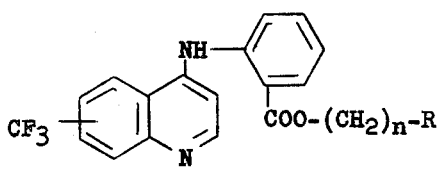

wherein $n$ is 1 or 2 and R is selected from the group consisting of unsaturated and saturated heterocyclics having a hetero-oxygen, a hetero-nitrogen and a hetero-nitrogen and oxygen, and their non-toxic, pharmaceutically acceptable acid addition salts. Among the more interesting compounds of formula I are 4-[2'-(β-pyridyl-methoxycarbonyl)]-phenylamino-7-trifluoromethyl-quinoline, 4-[2'-(α-tetrahydrofurfuryloxycarbonyl)]-phenylamino-7-trifluoromethyl-quinoline, and 4-[2'-(β-morpholinoethoxycarbonyl)]-phenylamino-7-trifluoromethyl-quinoline.

The novel compounds of formula I and their acid addition salts possess remarkable anti-inflammatory and analgesic activity. They are useful for the treatment of rheumatic and arthritic complaints and inflammation of the circulatory system.

Examples of suitable heterocyclic radicals falling within the definition of R are particularly 5- and 6-member hetero groups such as pyridyl, tetrahydrofuryl, morpholino, pyrrolidinyl, oxazolyl, etc.

Examples of suitable acids for the non-toxic, pharmaceutically acceptable acid addition salts are inorganic acids such as hydrochloric acid, sulfuric acid, nitric acid, phosphoric acid, etc. and organic acids such as acetic acid, tartaric acid, citric acid, maleic acid, malonic acid, fumaric acid, etc.

The novel process of the invention for the preparation of the 7- or 8-trifluoromethyl-quinolines of formula I comprises reacting a 4-(2'-alkoxycarbonyl)-phenylamino-7- or 8-trifluoromethyl-quinoline of the formula

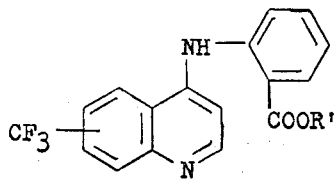

wherein R' is lower alkyl of 1 to 7 carbon atoms with an alcohol of the formula $$HO — (CH_2)_n — R \qquad III$$

wherein $n$ and R have the above definitions in the presence of a strong alkaline agent to form the desired compound of formula I which may be reacted with an acid to form the corresponding acid addition salt.

In preferred embodiments of the process, R' is methyl and the alcohol of formula III is derived from tetrahydrofuran, pyridine or morpholine. The alkaline agent is preferably an alkali metal, an alkali metal amide or an alkali metal hydride.

The 4-(2'-alkyloxycarbonyl)-phenylamino-7- or 8-) trifluoromethyl-quinolines of formula II can be prepared by the process of Belgian Pat. No. 710,321 or French Pat. No. 1,369,967 by condensation of a suitably substituted 4-chloro-quinoline and an alkyl anthranilate. An example of such a preparation, resulting in 4-(2'-methoxycarbonyl)-phenylamino-8-trifluoromethyl-quinoline, is given in Example I, by way of illustration. It is worthwhile to note that this compound also possesses an important anti-inflammatory activity and intense analgesic activity.

The anti-inflammatory and analgesic compositions of the invention are comprised of at least one compound of formula I or its acid addition salt and a major amount of a pharmaceutical carrier. The compositions may be in the form of injectable solutions or suspensions, in ampoules or multidose flacons, or in the form of tablets, coated tablets, capsules, syrups, suppositories and ointments.

The novel method of treating pain and inflammations in warm-blooded animals comprises administering to warm-blooded animals a safe and effective amount of at least one compound of formula I or its non-toxic, pharmaceutically acceptable acid addition salts. The said compounds may be administered orally, perlingually, transcutaneously, rectally or topically on skin or mucous membranes. The usual useful daily dose is 0.9 to 50 mg/kg depending upon the method of administration.

In the following examples there are described several preferred embodiments to illustrate the invention. However, it should be understood that the invention is not intended to be limited to the specific embodiments.

EXAMPLE I

Preparation of 4-(2'-methoxycarbonyl)-phenylamino-8-trifluoromethyl-quinoline Step A: Ethyl o-trifluoromethylanilinomethylene malonate A mixture of 54.8 g. of o-trifluoromethylaniline and 73.5 g. of ethyl ethoxymethylene malonate was heated to 120°C. under an inert atmosphere and held at this temperature for one hour while eliminating the ethanol thus formed by distillation. The mixture was cooled and the elimination of the ethanol was completed by distilling under reduced pressure. After cooling, 115 g. of ethyl o-trifluoromethylanilinomethylene malonate, used as is for the following stage, was obtained. A sample of this product recrystallized from petroleum ether (boiling point = 65° to 75°C.) had a melting point of 94°C.

Analysis: $C_{15}H_{16}F_3NO_4$: molecular weight = 331.288. Calculated: C, 54.38%; H, 4.87%; F, 17.21%; N, 4.23%. Found: C, 54.5%; H, 4.7%; F, 16.8%; N, 4.5%.

Step B:
3-carbethoxy-4-hydroxy-8-trifluoromethyl-quinoline

A mixture of 113 g. of crude ethyl o-trifluoromethylanilinomethylene malonate, obtained in Step A, and 115 cc of diphenyl ether was heated rapidly under an inert atmosphere. At about 195°C., the ethanol formed began to distill off. At the end of about 30 minutes, the internal temperature reached 250°C. and the reaction mixture was heated to reflux and maintained at reflux for one hour. After cooling, 25 cc of acetone were added to the reaction mixture which was allowed to stand to crystallize. The crystals thus formed were recovered by suction-filtering and washed and dried to obtain 71.5 g. of 3-carbethoxy-4-hydroxy-8-trifluoromethyl-quinoline with a melting point of 210° to 214°C., which was used as is for the following step. A sample of this product upon recrystallization from ethanol had a melting point of 216°C.

Analysis: $C_{13}H_{10}F_3NO_3$; molecular weight = 285.218. Calculated: C, 54.74%; H, 3.53%; F, 19.98%; N, 4.91%; Found: C, 54.5%; H, 3.8%; F, 19.6%; N, 4.9%.

Step C:
3-carboxy-4-hydroxy-8-trifluoromethyl-quinoline 70 g. of crude 3-carbethoxy-4-hydroxy-8-trifluoromethyl-quinoline, obtained in Step B, were added to a mixture of 300 cc of water and 100 cc of an aqueous 10 N sodium hydroxide solution under an inert atmosphere. The reaction mixture was heated to reflux and maintained there for two hours and 45 minutes. The solution thus obtained was poured into a mixture of water, ice and 100 cc of an aqueous 11.8 N hydrochloric acid solution. The precipitate thus formed was isolated by suction-filtering and washed with water and introduced into a solution of 20 g. of sodium bicarbonate in 2 liters of water. The mixture was heated to 90°C. A persistant slightly insoluble substance was removed by filtration. The filtrate was made acidic with acetic acid to adjust the pH to about 5.5. The precipitate thus formed was isolated by suction-filtering and washed and dried to obtain 58 g. of 3-carboxy-4-hydroxy-8-trifluoromethyl-quinoline with a melting point of 290° to 292°C., which was used as is for the following step. A sample of this product when crystallized from hot and cold acetone with treatment with charcoal gave pure 3-carboxy-4-hydroxy-8-trifluoromethyl-quinoline with a melting point of 292°C.

Analysis: $C_{11}H_6F_3NO_3$; molecular weight = 257.166. Calculated: C, 51.37%; H, 2.35%; F, 22.16%; N, 5.45%. Found: C, 51.6%; H, 2.6%; F, 21.8%; N, 5.3%.

Step D: 4-hydroxy-8-trifluoromethyl-quinoline 56.5 g. of crude 3-carboxy-4-hydroxy-8-trifluoromethyl-quinoline, obtained in Step C, was added to 110 cc of diphenyl ether under an inert atmosphere. The reaction mixture was rapidly heated to reflux and maintained at reflux for 1 hour and 15 minutes. The reaction mixture was cooled to about 50°C. and 20 cc of isopropyl ether were added thereto. The mixture was cooled to 20°C. and left to crystallize. The precipitate thus formed was recovered by suction-filtering and washed and dried to obtain 45.8 g. of 4-hydroxy-8-trifluoromethyl-quinoline with a melting point of 180°C. A sample of this product was crystallized from acetone with treatment with charcoal to obtain pure 4-hydroxy-8-trifluoromethyl-quinoline with a melting point of 180°C.

Analysis: $C_{10}H_6F_3NO$; molecular weight = 213.156. Calculated: C, 56.34%; H, 2.84%; F, 26.74%; N, 6.57%. Found: C, 56.6%; H, 3.1%; F, 26.5%; N, 6.5%.

Step E: 4-chloro-8-trifluoromethyl-quinoline

Into 130 cc of phosphorus oxychloride, there were introduced in small amounts 44.3 g. of crude 4-hydroxy-8-trifluoromethyl-quinoline, obtained in Step D, and the mixture was left for fifteen minutes at ambient temperature and then heated to reflux and maintained at reflux for one hour. The mixture was cooled and excess phosphorus oxychloride was removed by distillation under reduced pressure. Water, ice, then 80 cc of a 22° Be aqueous solution of ammonia were added to the residue and the mixture was stirred. The aqueous phase was extracted with ether, and the ethereal extracts were washed with a dilute aqueous solution of ammonia, and then with water. After drying, the solution was treated with charcoal and concentrated to dryness to obtain 45.4 g. of 4-chloro-8-trifluoromethyl-quinoline with a melting point of 78°C., which was used as is for the preparation of 4-(2'-methoxycarbonyl-phenylamino)-8-trifluoromethyl-quinoline. A sample of crude 4-chloro-8-trifluoromethyl-quinoline was crystallized from petroleum ether (boiling point = 65° to 75°C.) to obtain a product with a melting point of 78°C.

Analysis: $C_{10}H_5F_3ClN$; molecular weight = 231.605. Calculated: C, 51.86%; H, 2.18%; F, 24.61%; C., 15.3%; N, 6.05%. Found: C, 52.2%; H, 2.3%; F, 24.9%; Cl, 15.5%; N, 5.8%.

Step F:
4-(2'-methoxycarbonyl)-phenylamino-8-trifluoromethyl-quinoline 23.15 g. of crude 4-chloro-8-trifluoromethyl-quinoline, obtained in Step E, were added to 100 cc of an aqueous 2N hydrochloric acid solution, followed by the addition of 15.85 g. of methyl anthranilate. The reaction mixture was heated to reflux and held there for fifty minutes. The mixture was cooled and crystallization was allowed to develop. The precipitate thus formed was recovered by suction filtering, and was added to 300 cc of a saturated aqueous solution of sodium bicarbonate. The mixture was agitated and methylene chloride was added and agitation continued. A persistant insoluble substance was removed by filtering and the organic phase was separated by decanting. The latter was washed with water and concentrated to dryness. The residue was crystallized from methanol to obtain 21.3 g. of 4-(2'-methoxycarbonyl)-phenylamino-8-trifluoromethyl-quinoline with a melting point of 176°C.

Analysis: $C_{18}H_{13}F_3N_2O_2$; molecular weight = 346.30. Calculated: C, 62.43%; H, 3.78%; F, 16.46%; N, 8.09%. Found: C, 62.2%; H, 4.0%; F, 16.3%; N, 8.0%.

I.R. Spectrum (chloroform)
Absorption at 3,297 and 3,264 $cm^{-1}$ corresponding to the —N—H grouping
Absorption at 1,691 $cm^{-1}$ corresponding to carbonyl Absorption at 1,142 and 1,147 $cm^{-1}$ corresponding to the CF$_3$ grouping.

EXAMPLE II

4-[2'-(α-tetrahydrofurfuryloxycarbonyl)]-phenylamino-7-trifluoromethyl-quinoline 40 g. of tetrahydrofurfuryl alcohol and 40 cc of toluene were admixed and water was removed by azeotropic distillation. Then 40 cc of toluene were added and again the mixture was distilled at ordinary pressure and then under a vacuum of 20 mm of mercury. The temperature was adjusted to 85°C. and 250 mg of a 50% suspension of sodium hydride in paraffin oil, then 10 g. of 4-(2'-methoxycarbonyl)-phenylamino-7-trifluoromethyl-quinoline (obtained according to the process described in French Pat. No. 1,369,967) were added. The solution stood for 5 hours in vacuo at 85°C. and then was cooled. 100 cc of water were added thereto and the mixture was extracted with ether. The organic phases were washed with an aqueous solution of sodium chloride, dried over magnesium sulfate and evaporated to dryness. A mixture of 5 cc of methanol and 5 cc of isopropyl ether were added to the oily residue and the mixture was agitated for 1 hour in a bath of ice and suction-filtered. The precipitate was washed with petroleum ether to obtain 6.8 g. of a crude tetrahydrofurfuryl compound which was recrystallized from hot and cold isopropyl ether to obtain 2.7 g. of 4-(2'-tetrahydrofurfuryloxycarbonyl)-phenylamino-7-trifluoromethyl-quinoline. By concentration of the mother liquors from the crystallization, a second yield of 1.8 g. of the compound was obtained making a total of 4.5 g. (Yield: 37%).

4-[2'-(α-tetrahydrofurfuryloxycarbonyl)]-phenylamino-7-trifluoromethyl-quinoline appeared in the form of a colorless solid product soluble in alcohol, chloroform, ether and benzene and insoluble in water. Its melting point determined on a Maquenne block was 80°C.

Analysis: $C_{22}H_{19}N_2O_3F_3$; molecular weight = 416.39
Calculated: C, 62.02%; H, 4.98%; N, 9.43%; F, 12.8%;
Found: C, 62.2%; H, 5.0%; N, 9.7%; F, 12.4%.

As far as is known, this compound is not described in the literature.

EXAMPLE III

4-[2'-(β-pyridyl-methoxycarbonyl)]-phenylamino-7-trifluoromethyl-quinoline

Using the same conditions of Example II, 45 g. of 3-hydroxymethyl-pyridine and 10 g. of 4-(2'-methoxycarbonyl)-phenylamino-7-trifluoromethyl-quinoline were reacted to obtain 6.2 g. of 4-[2'-(β-pyridyl-methoxycarbonyl)]-phenylamino-7-trifluoromethyl-quinoline.

This product appeared in the form of a pale yellow solid product soluble in alcohol, chloroform and ether and insoluble in water. Its melting point, determined on a Kofler block, was 117°C.

Analysis: $C_{23}H_{16}N_3O_2F_3$; molecular weight = 423.38
Calculated: C, 65.26%; H, 3.80%; N, 9.92%; F, 13.46%. Found: C, 65.5%; H, 4.1%; N, 9.7%; F, 13.3%.

As far as is known, this compound is not described in the literature.

EXAMPLE IV

4-[2'-(β-morpholinoethoxycarbonyl)]-phenylamino-7-trifluoromethyl-quinoline

Using the same conditions of Example II, 43 g. of N-(β-hydroxyethyl)-morpholine and 10 g. of 4-(2'-methoxycarbonyl)-phenylamino-7-trifluoromethyl-quinoline were reacted to obtain 8.49 g. of 4-[2'-(β-morpholinoethoxycarbonyl)]-phenylamino-7-trifluoromethyl-quinoline.

This product appeared in the form of a pale yellow solid product soluble in alcohol, ether, acetone and chloroform and insoluble in water. Its melting point determined on a Kofler block was 80°C.

Analysis: $C_{23}H_{22}N_3O_3F_3$; molecular weight = 445.43
Calculated: C, 62.0%; H, 4.98%; N, 9.43%; F, 12.8%;
Found: C, 62.2%; H, 5.0%; N, 9.7%; F, 12.4%.

I.R. Spectrum

Absorption at 2,780 and 2,850 $cm^{-1}$, -N⟨ type

As far as is known, this compound is not described in the literature.

EXAMPLE V

4-[2'-(β-pyridyl-methoxycarbonyl)]-phenylamino-8-trifluoromethyl-quinoline

Using the same conditions as in Example II, 45 g. of 3-hydroxymethyl-pyridine and 10 g. of 4-(2'-methoxycarbonyl)-phenylamino-8-trifluoromethyl-quinoline were reacted to obtain 6.4 g. of 4-[2'-(β-pyridyl-methoxycarbonyl)]-phenylamino-8-trifluoromethyl-quinoline with a melting point of 130°C.

Analysis: $C_{23}H_{16}N_3O_2F_3$; molecular weight = 423.38.
Calculated: C, 65.26%; H, 3.80%; N, 9.92%; F, 13.46%. Found: C, 65.0%; H, 3.8%; N, 9.9%; F, 13.2%.

As far as is known, this compound is not described in the literature.

PHARMACOLOGICAL DATA

Analgesic Activity

The test employed was based on the fact noted by Koster et al. (Fed. Proc. 1959, 18, 412) according to which the intraperitoneal injection of acetic acid provoked repeated characteristic movements of stretching and twisting persisting in mice for more than 6 hours. Analgesics prevent or suppress this syndrome which is an exterior manifestation of a diffuse abdominal pain.

A solution of 6 parts per thousand of acetic acid in water containing 10% of arabic gum was employed and the dose provoking the syndrome in mice under these conditions was 0.01 cc/gm, being 60 mg/kg of acetic acid. The analgesics were administered orally to groups of five mice, which had not been fed for 24 hours, a half hour before the intraperitoneal injection of the acetic acid. The stretchings were observed, noted and counted for each mouse and then additionated by groups of five, during a period of observation of 15 minutes immediately after the injection of acetic acid. The average number of stretchings observed on the 12 control groups of five mice during the period of observation indicated, was established.

The products of the invention which were administered in the form of an aqueous suspension diminished the number of stretchings in a fashion obviously proportional to the doses utilized, as is shown in Table I which compares the products with aspirin.

TABLE I

| Product | Dose Administered in mg/kg | % of Stretchings compared to Controls |
|---|---|---|
| 4-(2'-tetrahydrofurfuryl-oxycarbonyl)-phenylamino-7-trifluoromethyl-quinoline | 5 | 57 |
| | 10 | 62 |
| | 20 | 27 |
| 4-[2'-(β-pyridyl-methoxycarbonyl)]-phenylamino-7-trifluoromethyl-quinoline | 5 | 60 |
| | 10 | 58 |
| | 20 | 23 |
| 4-[2'-(β-morpholino-ethoxycarbonly)]-phenylamino-7-trifluoromethyl-quinoline | 5 | 59 |
| | 10 | 45 |
| | 20 | 14 |

Table I shows that the 50% active dose ($AD_{50}$) for the compounds of the invention lies between 10 and 15 mg/kg as compared to an $AD_{50}$ of 160 mg/kg for aspirin.

Anti-inflammatory Activity

The anti-inflammatory activity of the following compounds was determined by the method of Branceni et al. slightly modified (Arch. Int. Pharmacodyn, Vol. 152, 1964, p. 15). The test used consisted in administering in a single injection 1 mg of naphtoylheparamine under the aponevrosis of the sole of a hind paw of rats weighing 150 gm. (This injection being destined to provoke the formation of an inflammatory edema). The products to be studied were administered in aqueous suspension by oral route one hour before the injection. The amount of inflammation was determined by plethysmometry, the volume of the paw being measured immediately prior and 2 hours after the irritating injection. The volumes at the hour $H_2$ were adjusted to their initial level, by the analysis of covariance. The degree of inflammation is calculated as a percentage of that of the controls animals. The results are summarized in Tables IIa, IIb and IIc.

TABLE IIa

4-[2'-(α-tetrahydrofurfuryloxycarbonyl)]-phenylamino-7-trifluoromethyl-quinoline

| | Dose Administered in mg/kg | Initial Volume | Volume at 2 hrs. adjusted by Covariance Analysis | % of Inflammation |
|---|---|---|---|---|
| Controls | 0 | 32.3 | 56.8 | 100 |
| Treated | 10 | | 48.8 | 67 |
| Controls | 0 | 30.03 | 54.8 | 100 |
| Treated | 5 | | 46.9 | 68 |
| | 15 | | 38.8 | 35 |

TABLE IIb

4-[2'-(β-pyridyl-methoxycarbonyl)]-phenyl-amino-7-trifluoromethyl-quinoline

| | Dose Administered in mg/kg | Initial Volume | Volume at 2 hrs. adjusted by Covariance Analysis | % of Inflammation |
|---|---|---|---|---|
| Controls | 0 | 30.03 | 54.8 | 100 |
| Treated | 10 | | 45.2 | 61 |
| | 30 | | 33.9 | 15 |
| Controls | 0 | 31.0 | 52.0 | 100 |
| Treated | 5 | | 48.1 | 81 |
| | 15 | | 41.5 | 50 |

TABLE IIc

4-[2'-(β-morpholinoethoxycarbonyl)]-phenyl-amino-7-trifluoromethyl-quinoline

| | Dose Administered in mg/kg | Initial Volume | Volume at 2 hrs. adjusted by Covariance Analysis | % of Inflammation |
|---|---|---|---|---|
| Controls | 0 | 30.8 | 57.3 | 100 |
| Treated | 5 | | 50.3 | 74 |
| | 15 | | 45.8 | 57 |
| | 45 | | 36.4 | 21 |

This test shows that the products of the invention have an important anti-inflammatory activity as their $AD_{40}$ is between 10 and 15 mg/kg as compared to an $AD_{40}$ of 30 to 60 mg/kg for aspirin under the same test conditions.

Various modifications of the compositions and method of the invention may be made without departing from the spirit or scope thereof.

We claim:

1. A compound selected from the group consisting of 7- and 8-trifluoromethyl-quinolines of the formula

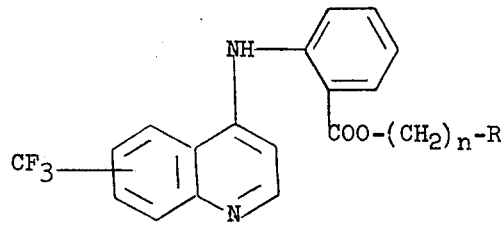

wherein n is 1 or 2 and R is selected from the group consisting of β-pyridyl and α-tetrahydrofuryl and their non-toxic, pharmaceutically acceptable acid addition salts.

2. A compound of claim 1 selected from the group consisting of 4-[2'-(β-pyridyl-methoxycarbonyl)]-phenylamino-7-trifluoromethyl-quinoline and its non-toxic, pharmaceutically acceptable acid addition salts.

3. A compound of claim 1 selected from the group consisting of 4-[2'-(α-tetrahydrofurfuryloxycarbonyl)]-phenylamino-7-trifluoromethyl-quinoline and its non-toxic, pharmaceutically acceptable acid addition salts.

4. A compound of claim 1 selected from the group consisting of 4-[2'-β-pyridyl-methoxycarbonyl)]-phenylamino-8-trifluoromethyl-quinoline and its non-toxic, pharmaceutically acceptable acid addition salts.

* * * * *